D. F. DWYER
TOOL STOCK.
No. 10,547. Reissued Dec. 30, 1884.
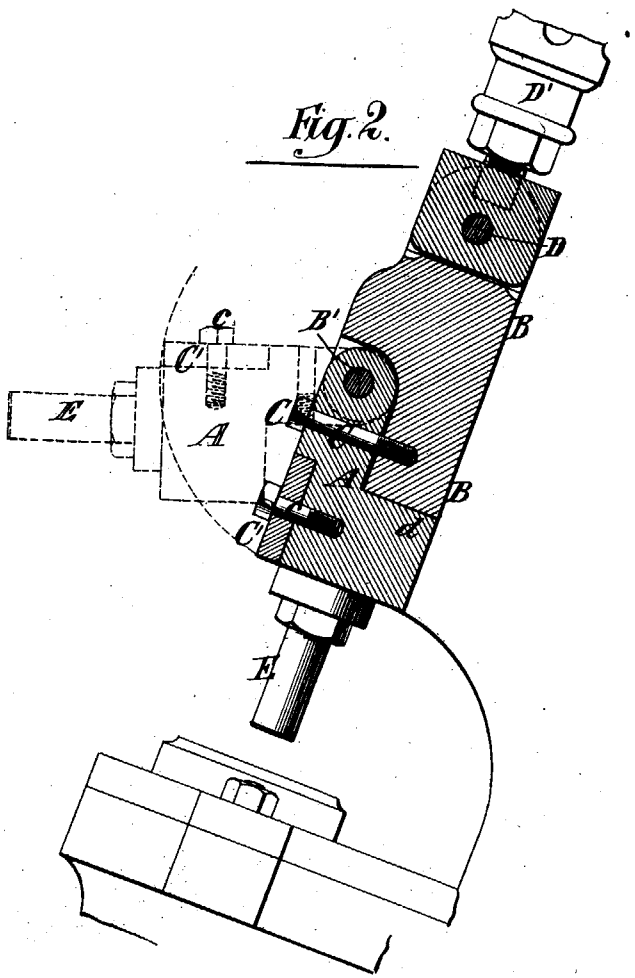
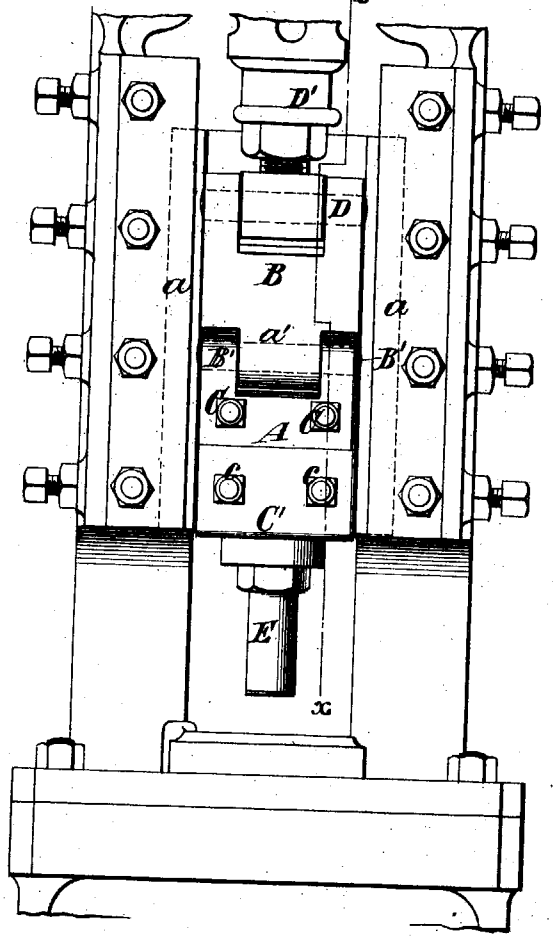
Witnesses:-
Louis M. T. Whitehead.
Fred Haynes
Inventor:-
Daniel F. Dwyer
by his Attys.
Brown & Hall
N. PETERS. Photo-Lithographer, Washington, D. C.

UNITED STATES PATENT OFFICE.

DANIEL F. DWYER, OF BROOKLYN, NEW YORK.

TOOL-STOCK.

SPECIFICATION forming part of Reissued Letters Patent No. 10,547, dated December 30, 1884.

Original No. 302,898, dated August 5, 1884. Application for reissue filed September 1, 1884.

*To all whom it may concern:*

Be it known that I, DANIEL F. DWYER, a citizen of the United States, residing at No. 171 Classon avenue, in the city of Brooklyn, county of Kings, and State of New York, have invented a new and useful Improvement in Tool or Die Holding Stocks; and I do hereby declare that the following is a full, clear, and exact description of the invention, which will enable others skilled in the art to which it appertains to make and use the same.

This improvement relates to "stocks" for holding the punch or tool in machines, by which the various operations of cutting and forming sheet metal and other materials are effected. Its object is to provide means whereby the punch or tool can be moved or swung outwardly and upwardly between the guides of the press-mandrel in such manner as to render easy and simple the repair or removal of the punch or tool.

To this end the invention consists in the combination, with a press-mandrel and guides therefor, of a punch-stock or tool-holder and bolts, whereby it is secured to the mandrel, the stock or holder being less in width than the space between the guides, whereby provision is afforded for moving it outward between said guides when the bolts are removed to gain access to the punch or tool without removing it from its stock or holder.

The invention also consists in the combination, with a press-mandrel and guides therefor, of a punch-stock or tool-holder hinged to the mandrel, and made less in width than the space between the guides, whereby it is capable of being moved or swung outward from the mandrel between said guides, to afford access to the punch or tool without removing it from its stock or holder.

The invention also consists in other novel combinations of parts, hereinafter described.

Referring to the annexed drawings, Figure 1 represents a vertical front elevation of a stock or holder constructed according to my invention, and embodying, in connection therewith, as much of a punch or machine as is necessary to illustrate its working. Fig. 2 represents a vertical sectional elevation on the dotted line *x x* of Fig. 1 of the mandrel and punch-stock, to more clearly show their construction, the manner of swinging the punch-stock outwardly and upwardly being fully represented in dotted lines.

Reference being had to the several parts by letters, *a a* represent two vertical standards, between which the mandrel moves, and in which it is guided vertically. The mandrel B is fitted to the guides *a*, as is usual in presses, and is operated by a link or connecting-rod, D′, which is pivoted to its upper end at D in a well-known manner. The punch-stock or tool-holder A is of less width than the mandrel B, and is capable of being passed between the guides *a*, to which the mandrel is fitted, said punch-holder being less in width than the distance between the guides. As here shown, the front of the mandrel B is formed with a projection, *a′*, which fits in a corresponding recess in the stock or holder A, or vice versa, and the stock or holder is pivotally connected with or hinged to the mandrel by a hinge-pin, B′.

C C designate screws, which are inserted through the front of the stock or holder A and into the mandrel B, as shown in Fig. 2. These screws serve to rigidly connect the stock or holder A with the mandrel.

E designates the punch or tool, which is secured in the stock or holder A by a cap, C′, in the usual way. The cap C′ is held in place and tightened on the punch by screws *c*, which are inserted through it into the stock or holder A, as shown in Fig. 2; but the plate does not extend beyond the side edges of the stock or holder, and offers no obstacle to the free outward movement of the stock or holder between the guides *a*.

From the above description it will be understood that when it is desired to gain access to the punch or tool E for repair or any other purpose it is only necessary to take out the screws C, and the stock or holder may then be swung or moved outward between the guides *a*, as shown by dotted lines in Fig. 2. The stock or holder A is of L shape, or has a rearward projection, *d*, which has a bearing on the under side of the mandrel B, as shown in Fig. 2, and so relieves the pin B′ of strain.

What I claim as my invention, and desire to secure by Letters Patent, is—

1. The combination, with a press-mandrel and guides therefor, of a punch-stock or tool-holder, and bolts whereby it is secured to the mandrel, the said stock or holder being less in width than the space between said guides, whereby provision is afforded for moving it outward between said guides when said bolts are removed, substantially as herein described.

2. The combination, with a press-mandrel and guides therefor, of a punch-stock or tool-holder hinged to the mandrel, and made less in width than the space between the guides, whereby it is capable of being swung outward from the mandrel between said guides, to afford access to the punch or tool without removing it from its stock or holder, substantially as herein described.

3. The combination, with a press-mandrel, B, and its guides *a*, of the L-shaped tool-holder or punch-stock A, hinged at B′ in the front of the mandrel, and having a bearing on the lower end thereof, and screws C for rigidly securing said holder or stock A to the mandrel, the holder or stock being less in width than the space between the guides *a*, whereby it is capable of being swung outward between said guides when the screws C are removed, substantially as herein described.

4. The combination, with the mandrel B, having a recess, as described, of the punch-stock or tool-holder A, having a projection fitting in said recess, the pin B′, plate C′, screws C *c*, and punch or tool E, substantially as shown and set forth.

DANIEL F. DWYER.

Witnesses:
C. HALL,
FREDK. HAYNES.